Nov. 4, 1941.  H. B. BROWN  2,261,826
THERMOMETER
Filed Aug. 26, 1939
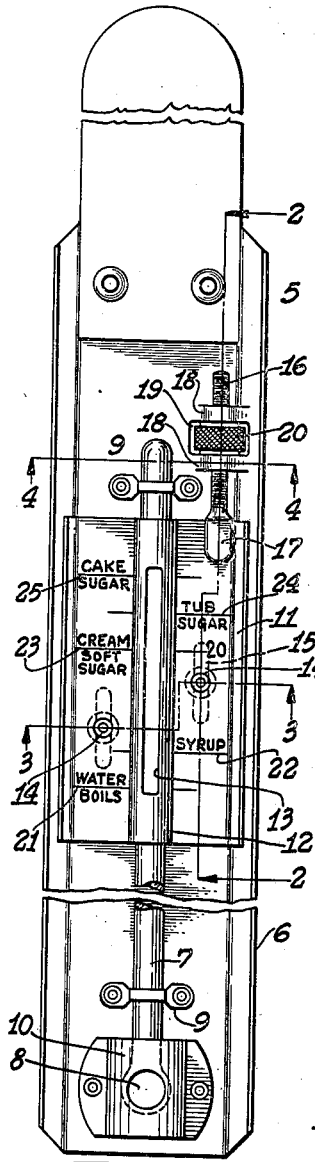
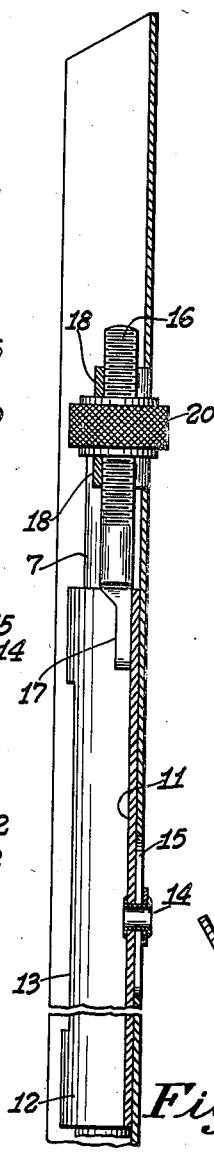
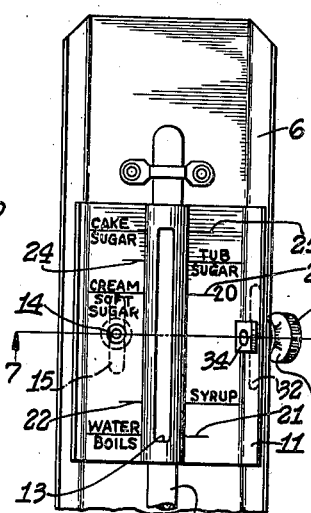
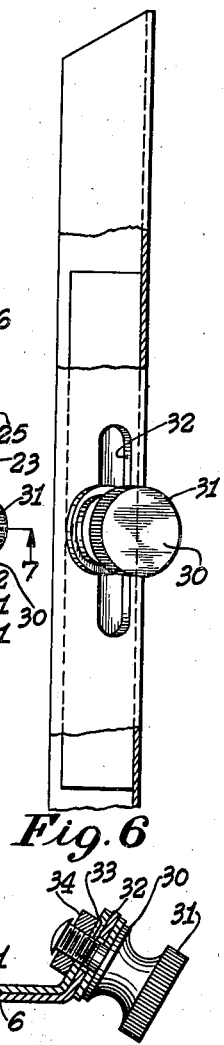
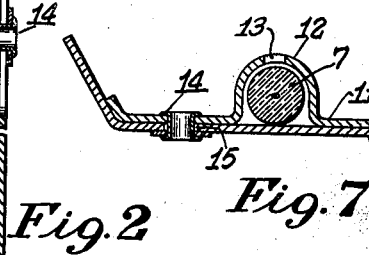
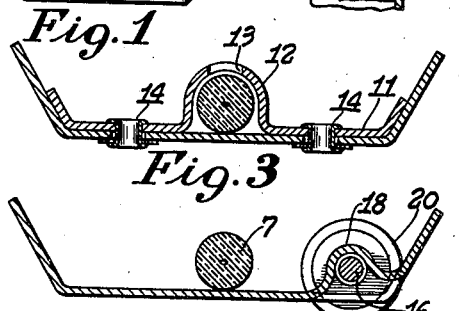
INVENTOR.
H. BRAINARD BROWN
BY D. Clyde Jones
ATTORNEY.

Patented Nov. 4, 1941

2,261,826

UNITED STATES PATENT OFFICE 2,261,826

THERMOMETER

H. Brainard Brown, Rochester, N. Y., assignor to Taylor Instrument Companies, Rochester, N. Y., a corporation of New York Application August 26, 1939, Serial No. 292,125

4 Claims. (Cl. 73—376)

This invention relates to thermometers particularly adapted for use in the production of maple sugars and maple syrup, and the like.

Fresh maple sap has a specific gravity about the same as water. However, before it can be sold as maple syrup in conformity with the law it must have a certain specific gravity, usually of 1.325. The fresh maple sap is usually heated to a temperature of 219° F. when it is assumed to have the required specific gravity. However, due to varying atmospheric conditions and differences in elevation above sea level of the "sugar bushes" the boiling point of the fresh sap varies and it may be evaporated too little or too much, with the result that the specific gravity of the sap may be less than or greater than that legally required for maple syrup. In the event the sap is evaporated more than necessary, it will be apparent that the producer loses a substantial amount of the sap through unnecessary evaporation and the resulting rich syrup may granulate so that a marketable product is not obtained. It is a purpose of this invention to provide a thermometer having an adjustable scale plate which may be adjusted to compensate for the changes in the boiling point of fresh sap so that the point at which the sap has been converted to maple syrup may be accurately determined. The thermometer scale plate is provided with a series of graduations one of which can be set to correspond to the mercury or spirit level of the thermometer when the fresh sap has reached the boiling point. The spacing of another of the graduations is such that once the scale plate has been adjusted, this graduation will indicate the temperatures at which the sap has been reduced to maple syrup. Other graduations on the scale plate will indicate when the sap has been converted to the various sugars such as "cream soft," "tub" or "cake."

It is accordingly an object of the present invention to provide a thermometer having an adjustable scale plate provided with suitable graduations to indicate the boiling point of maple sap and also the temperature at which the sap has been reduced to maple syrup. The scale plate may also be graduated to indicate the temperatures at which the sap has been converted to cream soft sugar, tub sugar and cake sugar.

It is a further object of the invention to provide a thermometer of the character referred to, which may be readily adjusted by means carried by thermometer.

These and other objects will appear from the detailed description and claims when taken with the drawing, in which Fig. 1 is a face view of a thermometer made in accordance with the present invention; Fig. 2 is a vertical section taken on line 2—2 of Fig. 1 with the handle omitted, this view particularly illustrating the slidable scale and the means for adjusting it; Figs. 3 and 4 are horizontal sections taken on lines 3—3 and 4—4, respectively, of Fig. 1 to show certain details of the preferred construction; Fig. 5 is a fragmentary face view of a slightly modified form of the invention; Fig. 6 is a side view looking from the right of Fig. 5 with parts thereof broken away to show the details of the construction; and Fig. 7 is a horizontal section taken on line 7—7 of Fig. 5.

In Figs. 1 to 4 inclusive, there has been shown a thermometer generally designated 5 which comprises a trough-like back 6 having mounted thereon a thermometer tube 7 terminating in a bulb portion 8. The thermometer tube may be secured to the back 6 by means of the straps 9, while a suitable guard 10 fixed to the back 6 protects the bulb from injury. If desired, a conventional temperature scale (not shown) may be fixed to the back, or etched directly thereon so that the thermometer may be used in the usual manner.

The thermometer thus far described may be of any desired or known construction. However, in order to accomplish the purpose of the present invention the thermometer is provided with a scale plate 11 having a rounded portion 12 to receive the thermometer tube 7. The rounded portion is provided with an elongated slot 13 to expose a portion of the mercury column of the thermometer tube. The scale plate is slidably mounted on the back in any convenient manner as by means of the rivets 14 which are received in the elongated slots 15 formed in the thermometer back. The scale plate carries a screw 16 which has its flattened end 17 welded or otherwise secured thereto. This screw extends through the struck-up brackets 18 integral with the back 6 and located on opposite sides of a transverse slot 19. A knurled nut 20 threaded on the screw and disposed between the spaced brackets extends through the slot so that it may be easily engaged by the thumb and index finger. The brackets maintain the nut against axial movement but by rotating the nut the scale plate may be moved along the thermometer back. This arrangement effectively provides means for adjusting the scale plate by small increments of movement.

The scale plate is provided with a series of graduations 21, 22, 23, 24 and 25 having appropriate legends 26. For example the lower graduation 21 may be marked "water boils" or "sap boils." Either of these legends may be used since fresh maple sap has substantially the same specific gravity and therefore the same boiling point as water. The second graduation 22 is preferably marked "syrup" while the third, fourth and fifth graduations 23, 24 and 25 are marked "cream soft sugar," "tub sugar" and "cake sugar," respectively. These various graduations will have been calibrated so that with proper setting of the scale plate, the condition of the sap at various temperatures may be accurately determined.

The thermometer is used in the following manner. When the fresh maple sap has reached the boiling point, the thermometer bulb is placed in the sap, causing the mercury in the tube to rise to a certain level. The scale plate is then adjusted by means of the knurled nut to bring the lower graduation 21 in line with the level of the mercury column. After setting the scale plate in this manner, the attendant need only note when the mercury column reaches the "syrup" graduation 22 to be certain that the sap has boiled down sufficiently to meet the legal requirements of maple syrup. If it is desired to make cream soft sugar, the temperature of the sap is raised until the mercury column reaches the "cream soft sugar" graduation 23, at which time cream soft sugar will have been produced. Similarly, if tub or cake sugar is desired, the sap is heated until the mercury column reaches either the "tub sugar" or the "cake sugar" graduations.

In Figs. 5, 6 and 7 there has been illustrated a slightly modified form of the invention which is utilized in the same manner as the previously described thermometer, the only material difference being that a modified means has been provided for adjusting the scale plate. Thus, in this form of the invention the thermometer also comprises a back 6, a thermometer tube 7, a bulb (not shown) and a scale plate 11. This scale plate is also provided with graduations 21, 22, 23, 24 and 25, similar to those described above for indicating the temperatures at which maple sap boils and when maple syrup and the various maple sugars are produced. This scale plate is also slidably guided along the back 6, as by means of a rivet 14 carried by the scale plate and slidably received in the slot 15. The scale plate is also guided for movement by means of a bolt 30 having a knurled head 31, which bolt extends through an elongated slot 32 formed in the thermometer back and an aperture 33 in the scale plate. A nut 34 threaded on the free end of the bolt together with the knurled head, provides a simple means for clamping the scale plate in adjusted position. By turning the knurled head of the bolt to loosen the nut 34, the scale plate may be shifted to set the lower graduation 21 in alinement with the top of the mercury column of the thermometer tube to indicate the point at which the sap reached the boiling point. The nut is tightened to maintain the scale plate in this adjusted position. This modified form of the invention is used in the same manner as the previously described construction to accurately determine when the sap has been converted to syrup, or the various maple sugars.

While the present thermometer is particularly useful in the production of maple sugar and syrup from sap, the invention is not to be so limited, but is applicable for any use wherein it is desired to indicate the degree of concentration of a solution with reference to a given liquid, such as water.

I claim:

1. A thermometer comprising a back having a portion thereof trough-shaped in transverse section, a thermometer tube and bulb fixed to said back, a thermosensitive liquid in said tube and said bulb, a scale plate trough-shaped in cross section and snugly nesting in said back for adjustable movement thereon, said scale plate overlying said tube and having an opening therein through which the thermometer tube is visible, means for holding said scale plate in adjusted position on said back, a graduation on said scale plate adapted to be set to the level of the thermosensitive liquid in said thermometer tube when the material in which said thermometer is placed reaches the boiling point, and a second graduation on said scale plate adapted to indicate the specific gravity of the material when the thermosensitive liquid is in alinement therewith after the setting of said first-mentioned graduation.

2. A thermometer comprising a back having a portion thereof trough-shaped in transverse section, a thermometer tube and bulb fixed to said back, a thermosensitive liquid in said tube and said bulb, a scale plate trough-shaped in cross section and snugly nesting in said back for movement thereon, said scale plate overlying said tube and having an opening therein through which the thermometer tube is visible, means for adjusting said scale plate along said back by small increments of movement and for holding said scale plate in adjusted position, a graduation on said scale plate adapted to be set with the level of the thermosensitive liquid in said thermometer tube when the material in which said thermometer is placed reaches the boiling point, and a second graduation on said scale plate adapted to indicate the specific gravity of the material when the thermosensitive liquid is in alinement therewith after the setting of said first-mentioned graduation.

3. A thermometer comprising a back having a portion thereof trough-shaped in transverse section, a thermometer tube and bulb fixed to said back, a thermosensitive liquid in said tube and said bulb, a scale plate trough-shaped in cross section and snugly fitting in said back for movement thereon, said scale plate overlying said tube and having an opening therein through which the thermometer tube is visible, a screw having one end thereof fixed to said scale plate, a pair of spaced brackets fixed to said back, a nut threaded on said screw and disposed between said brackets being held thereby against axial movement, said nut being rotatable on said screw to shift said scale along said back and tube.

4. A thermometer comprising a back having upturned side margins to provide a portion trough-shaped in transverse section, a thermometer tube and bulb fixed to said back, a thermosensitive liquid in said tube and said bulb, a scale plate having its side margins bent to provide spaced parallel folds, said scale plate being mounted on said back with said folds engaging the upturned margins of said back for adjustable movement thereon, said scale plate overlying said tube and having an opening therein through which the thermometer tube is visible, means for holding said scale plate in adjusted position on said back, a graduation on said scale plate adapted to be set to the level of the thermosensitive liquid in said thermometer tube when the material in which said thermometer is placed reaches the boiling point, and a second graduation on said scale plate adapted to indicate the specific gravity of the material when the thermosensitive liquid is in alinement therewith after the setting of said first-mentioned graduation.

H. BRAINARD BROWN.